United States Patent [19]

McCaskey, Jr. et al.

[11] 4,046,937

[45] Sept. 6, 1977

[54] MELAMINE-ALDEHYDE RESIN AND POSTFORMABLE LAMINATE MADE THEREFROM

[75] Inventors: Harold O. McCaskey, Jr., Allendale; Lenon G. Brooker, Hampton, both of S.C.

[73] Assignee: Westinghouse Electric Corporation, Pittsburgh, Pa.

[21] Appl. No.: 513,785

[22] Filed: Oct. 10, 1974

[51] Int. Cl.$^2$ ............... B32B 29/00; B32B 29/04; B32B 15/14; B32B 21/04
[52] U.S. Cl. ............... 428/211; 428/274; 428/278; 428/413; 428/524; 428/525; 428/527; 428/530; 428/531; 260/29.4 R; 260/29.2 EP; 260/831; 260/33.2 R; 156/335; 156/331; 260/67.6 R; 260/67.7; 428/460; 428/464; 428/461
[58] Field of Search ............. 260/33.2 R, 831, 29.4 R; 428/524, 527, 531, 274, 278, 413, 525, 530, 211; 156/335, 331

[56] References Cited

U.S. PATENT DOCUMENTS

| | | | |
|---|---|---|---|
| 2,528,360 | 10/1950 | Greenlee | 260/45.2 |
| 2,678,308 | 5/1954 | Suen | 260/33.2 |
| 2,711,380 | 6/1955 | Pintell | 428/530 X |
| 2,807,651 | 9/1957 | Britton et al. | 260/611 R |
| 3,153,003 | 10/1964 | O'Brien | 260/29.4 |
| 3,274,026 | 9/1966 | Nyquist | 428/525 X |
| 3,378,433 | 4/1968 | Palazzolo et al. | 161/264 X |
| 3,444,037 | 5/1969 | Armour | 161/257 X |
| 3,470,134 | 9/1969 | Ungar | 161/257 X |
| 3,479,247 | 11/1969 | Bonzagni | 428/530 |
| 3,487,124 | 12/1969 | Yeshin | 161/257 |
| 3,507,828 | 4/1970 | Ashjian | 260/47 |
| 3,523,051 | 8/1970 | Yasutake | 156/331 |
| 3,523,051 | 8/1970 | Yasutake | 161/263 X |
| 3,691,121 | 9/1972 | Anderson et al. | 161/264 X |
| 3,730,828 | 5/1973 | Meiser | 161/258 |
| 3,802,955 | 4/1974 | Powanda et al. | 161/258 X |
| 3,857,815 | 12/1974 | Smith et al. | 428/531 X |
| 3,857,815 | 12/1974 | Smith et al. | 428/413 X |

*Primary Examiner*—P. C. Ives
*Attorney, Agent, or Firm*—R. D. Fuerle

[57] ABSTRACT

A melamine-aldehyde resin is disclosed of a composition of melamine-aldehyde, a water-soluble, aliphatic diglycidyl ether, and water. The composition is cured to the A-stage and an absorbent sheet is impregnated with the resin which is then cured to the B-stage. At least one B-staged sheet is stacked with a postformable core stock and heated and pressed to form a C-staged postformable laminate. The laminate can be heated and pressed to postform it. The postformed laminate can be adhesively bonded to a substrate to form a counter top or other article.

68 Claims, No Drawings

MELAMINE-ALDEHYDE RESIN AND POSTFORMABLE LAMINATE MADE THEREFROM

BACKGROUND OF THE INVENTION

Melamine-formaldehyde resins are extensively used for impregnating print and overlay sheets in the manufacture of decorative laminated plastics because of their transparency, toughness, light stability, and relatively low cost. Despite the widespread use of melamine-formaldehyde resins in decorative high-pressure laminates, these resins have on major deficiency in that they are quite brittle in an unmodified state which limits their use in the preparation of decorative high-pressure post-forming-type laminates. A postformable laminate is a fully-cured laminate which can nevertheless be heated and bent into a new shape. See U.S. Pat. Nos. 3,378,433 and 3,730,828. Melamine-formaldehyde resins are made postformable by the addition of a number of plasticizing agents that are widely known in the art such as glycols, polyesters, and a number of amino compounds such as guanamines, sulfonamides, etc. See U.S. Pat. Nos. 3,470,134, 2,817,614, and 3,082,180.

Although these additives enable laminates to be post-formed, high temperatures (325° F) are often required. Lower temperatures are desired because many pigments are only guaranteed against discoloration up to 320° F. High temperatures also increase the risk of blistering and decrease productivity since more time is required to heat the laminate. Also, prior art postformable laminates were only guaranteed to postform over a ¾ inch radius, although occasionally a radius of ⅜ inch could be obtained under optimum conditions. The minimum postforming radius limits the range of designs which can be used.

PRIOR ART

U.S. Pat. No. 2,678,308 discloses modifying a melamine-formaldehyde resins with a compound of the formula RO[(CH$_2$)$_n$O]$_m$—CH$_2$—CHOH—CH$_2$[O(CH$_2$)$_n$]$_m$—OR where R is alkyl. The compound is prepared by reacting an epichlorohydrin with a monoalkyl ether of a diprimary aliphatic alcohol containing 1 to 6 alkyleneoxy groups.

U.S. Pat. No. 2,528,360 discloses adding aromatic epoxies to melamine aldehyde resins.

U.S. Pat. No. 3,507,828 disclosed reacting melamine with an epoxy such as epoxidized butadiene. The reaction product is then reacted with an aldehyde.

U.S. Pat. No. 3,523,051 contains the statement that it is known to modify aminotriozine resins with epoxy resins.

SUMMARY OF THE INVENTION

We have discovered that water-soluble aliphatic diglycidyl ethers greatly increase the postformability of melamine-aldehyde resins.

Our preferred diglycidyl ethers reduce the postforming temperatures of the laminates to about 250° F. which greatly decreases the chance of blistering or discoloration, and increases productivity because less time is required to raise the laminate to that temperature.

Also, our postformable laminates are being sold guaranteed to postform over a ⅛ inch radius and they have been postformed at a radius as small as ¼ inch. Finally, the laminates of this invention exhibit superior gloss and the reduction of solvent areas usually present on conventional postforming laminates.

DESCRIPTION OF THE INVENTION

THE COMPOSITION

A composition is prepared of an aldehyde, melamine, and water. A water-soluble, aliphatic diglycidyl ether may be included in the initial composition or it may be added to the composition after the composition has been reacted to the A-stage. The latter is preferred since, if the diglycidyl ether is added initially the composition should be used within about 24 hours, but if the diglycidyl ether is added after the A-stage the composition can be stored for about 48 hours (at room temperature). It is also believed to be possible to impregnate the absorbent sheet with the diglycidyl ether instead of adding it to the composition, but this procedure is not preferred as it is not known how well it works.

THE ALDEHYDE

The mole ratio of aldehyde to melamine should be at least about 1.5 (i.e., moles of aldehyde divided by moles of melamine should equal at least about 1.5) since less aldehyde may render the melaminealdehyde water-insoluble. The mole ratio of aldehyde to melamine should not exceed about 6 since more aldehyde will decrease the postformability of the resin. The preferred mole ratio of aldehyde to melamine is about 1.5 to about 2.5 as this range usually produces laminates with the best postforming characteristics.

Suitable aldehydes include acetaldehyde, propionaldehyde, furfuraldehyde, benzaldehyde, glyoxol, methylglyoxal, etc. Mixtures of aldehydes may also be used. The preferred aldehyde is formaldehyde as it is readily available and less expensive.

THE DIGLYCIDYL ETHER

The amount of water-soluble, aliphatic diglycidyl ether should be at least about 1%, based on the melamine, (all percentages herein are by weight unless otherwise indicated), since less than 1% does not have much effect on the postformability of the laminate. The amount of diglycidyl ether should be less than about 50%, based on the melamine, since, if more than about 50% is used the laminate is too soft. A preferred amount, which generally is a good compromise of these opposing considerations, is about 5 to about 15% (based on the melamine).

The diglycidyl ether must be water-soluble, where "water-soluble" means that 30 grams can be completely dissolved in 70 grams of water. The glycidyl ether must also be aliphatic since experiments using aromatic diglycidyl ethers such as various diglycidyl ethers of bisphenol A have failed due to the insolubility of the diglycidyl ether. The diglycidyl ether must contain two glycidyl ether groups

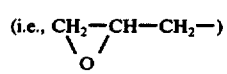

as epoxies which are not diglycidyl ethers do not work. Some, such as bis (3,4-epoxy-6-methylcyclohexylmethyl) adipate and alicyclic diepoxy carboxylate are not soluble and others such as 3,4-epoxy-cyclohexylmethyl-3,4-epoxycyclohexane carboxylate and vinylcyclohexane dioxide, discolor in ultraviolet light. Triglycidyl or monoglycidyl ethers should also be avoided.

Suitable diglycidyl ethers include those within the scope of the general formula:

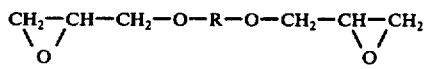

where R is
1. $-(CR'-)_x$,
2. $-(CH_2-CH_2-O-)_x$,

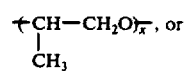    (3)

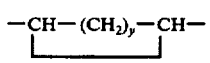    (4)

where R' is hydrogen or alkyl to about $C_5$.

In the formula x denotes the number of times the group in parenthesis is repeated. Each repetition of the group in parenthesis need not be the same. This number has a lower limit of one and an upper limit determined by the solubility of the diglycidyl ether. The y in the formula determines the size of the ring and can be 3 or 4.

Examples of diglycidyl ethers where R is $-CR'-_x$ include compounds formed by the reaction of epichlorohydrin with a glycol, for example, 1,4-butanediol diglycidyl ether, the diglycidyl ether of 2,2-dimethyl-1,3-propanediol (commonly called the "diglycidyl ether of neopentyl glycol"), and the diglycidyl ether of propylene glycol.

Examples of diglycidyl ethers where R is $-(CH_2-CH_2-O-)_x$ or

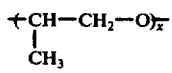

include compounds formed by the reaction of epichlorohydrin with a polyglycol. When the polyglycol is formed by reacting ethylene glycol with ethylene oxide the $-(CH_2-CH_2-O-)_x$ R group results and when the polyglycol is formed by reacting ethylene glycol with propylene oxide the

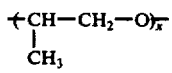

R group results. These polyglycol-based ethers are the preferred diglycidyl ethers as they are believed to be more soluble than other suitable diglycidyl ethers. Also, due to their longer chains and the presence of the polyether R group, they are believed to produce a greater degree of postformability in the laminate. Examples of suitable polyglycol-based diglycidyl ethers include the "Epon 8712" and "XD7160" products described in the examples presented hereinafter.

Examples of diglycidyl ethers where R is

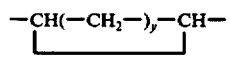

(i.e., the cycloaliphatic diglycidyl ethers) include the diglycidyl ether of cyclohexane diol and the diglycidyl ether of cyclopentane diol.

OTHER INGREDIENTS

In order to make certain that the diglycidyl ether is fully cured it is preferable to include an epoxy curing agent in the composition. About 0.25 to about 3% (based on the diglycidyl ether) is a suitable amount and about 1% is preferred. A primary amine such as triethylamine is preferred to anhydrides as anhydrides may cause color instability.

The amount of water used should be sufficient to produce a solution of at least about 15% solids (including the diglycidyl ether) since weaker solutions do not deposit enough solids on the paper and are costly to dry. The solution should be less than about 65% solids as a thicker solution does not saturate the paper well although a vacuum could be used to pull it into the paper. A good working range is about 40 to about 60% solids.

The composition preferably includes about 0.01 to about 1 phr (parts per hundred parts resin, where "resin" refers to the weight of melamine plus aldehyde plus diglycidyl ether) of an internal mold release agent. About 0.15 to about 0.5 phr is the preferred amount. The mold release may also be external, but an internal mold release is preferred as it eliminates the operation of coating the plates. Mold releases are well-known in the art. Suitable external mold releases include calcium stearate and sodium stearate. Suitable internal mold releases include various fatty alcohol phosphates, fatty acid polyglycols, and alkyl ammonium phosphate ester. The preferred internal mold release are fatty alcohol phosphates because they have the least effect on surface appearance. The internal mold release is preferably added after the A-stage as it is not needed in the initial composition.

A plasticizer is preferably included in the composition in order to enhance the postformability of the laminate. Less than about 1% (based on the melamine) does not have much effect and more than about 40% makes the laminate soft and causes hazing, a whitening of the surface when contacted with hot water. A preferred amount is about 5 to about 20%. Suitable plasticizers are described in U.S. Pat. Nos. 3,470,134, 2,817,614, and 3,082,180. A preferred plasticizer is toluene sulfonamide. The plasticizer is also preferably added after the A-stage as it is not needed prior to then.

After the A-stage it is preferable to add a solvent to the resin to add to its storage life, especially when the solids content is low. Generally, about 1 phr is necessary to have an effect on storage life and more than about 10 phr is unnecessary. Suitable solvents include ethanol, isopropanol, and butanol. Methanol is preferred as it is inexpensive and easy to evaporate.

PREPARATION OF LAMINATE

The composition is first reacted to the A-stage. This reaction should be conducted at a pH of at least about 7.8 as at a lower pH the reaction may be too rapid to control. However, a pH in excess of about 9 generally requires too much time. A good operating pH is about 8.3 to about 8.5. The reaction may be conducted at the reflux temperature which is usually about 97° C. The reaction is complete when the water dilutability of the resin has decreased to about 100 to 300% by volume (experimentally determined). The pH can then be adjusted to about 9.2 to about 9.5 to increase the storage life of the resin.

If the diglycidyl ether was not added initially, it is added now, after the A-stage, as are other ingredients previously described if used.

The resin is then applied to a suitable absorbent sheet of paper or cloth. Paper is preferred as it is less expensive than cloth. Rayon paper, Orlon paper, cotton linters paper, or other paper can be used but alpha-cellulose paper is preferred for both the decorative print sheet and the overlay sheet.

The resin is generally applied to the paper or cloth by passing the paper or cloth through a trough of the resin then through metering rolls which remove excess resin. A weight ratio of resin solids to substrate of between about 1.2 and about 4.0 should be used for the decorative sheet, and a weight ratio of about 1.4 to about 1.8 is preferred. For the overlay sheet, a weight ratio of resin solids to substrate of between about 2.0 and about 4.0, should be used and a ratio of about 2.5 to about 3.0 is preferred. If a solid-color print sheet is used, the overlay sheet can be eliminated. In that event the solids-to-substrate ratio is about 1.2 to about 4.0, and 2.0 to about 2.5 is preferred. For better postformability the diglycidyl ether should be present in the resin which coats both the overlay and the print sheet.

The coated substrate is passed through an oven at about 150° to about 325° F. for about 30 seconds to about 2½ minutes in order to evaporate the solvent and B-stage the resin.

Laminates are formed by stacking sheets of substrates coated with the B-staged postformable resin, as is known in the art. A typical laminate consists of core stock covered with one print sheet and one overlay sheet on top. Core stock typically consists of about 1 to about 15 sheets of an absorbent sheet impregnated with a B-staged phenol-aldehyde resin, usually phenolformaldehyde. The core stock is usually Kraft paper, but cloth and other papers can also be used.

The laminates are assembled and groups of laminates separated by metal spacers are pressed at about 1000 to about 1500 psi. at about 250° to about 300° F. for about 30 minutes. After cooling for about 30 minutes the press is opened and the C-staged laminates are removed.

The C-staged laminates can be postformed by heating at about 250° to about 400° F., bending, and cooling. At less than about 250° F. the laminate may crack during postforming and at more than about 400° F. the laminate is very likely to blister, char, and discolor. The best temperature range for postforming is believed to be about 300° to about 325° F. The C-staged laminates generally range is size from about 3 to 5 feet wide by about 8 to 12 feet long and about 0.025 to ⅛ inch thick. They can be bonded, usually with an adhesive, to a substrate such as thin board, plywood, steel, particle board, or other material to form a counter top, desk top, interior of a subway car, cabinet door, or other article.

The following examples further illustrate this invention. All of the laminates prepared in these examples according to this invention were postformed to a radius of ¼ inch at 250° F. using the testing apparatus and procedure of NEMA test LD1-2.11 from book LD1-1971.

All laminates prepared according to this invention in the following examples met or exceeded all NEMA standards (Book LD1-1971) for postformable grade decorative laminates including resistance of surface to wear (LD2.01), resistance of surface to boiling water (LD2.02), resistance of surface to high temperature (LD2.03), resistance of surface to cigarette burn (LD2.04), resistance of surface to stains (LD2.05), color fastness to light (LD2.06), emersion in boiling water (LD2.07), dimensional change (LD2.08), flexural strength (LD2.09), inspection for appearance (LD2.10), determining formability (bend test) (LD2.11), determination of surface finish (LD2.13), resistance to impact (LD2.15), and conductive heat resistance (LD2.16).

EXAMPLE I

Part A

A reaction flask was charged with 477 grams of 37% formaldehyde (5.9 moles) and 239 grams of water. The formaldehyde-water solution was adjusted to pH 8.5 with 10% sodium hydroxide. Then 450 grams of melamine (3.58 moles) were added to the reaction mixture and the mixture was refluxed for ten minutes. The reaction was cooled to 90° C. and 45 grams of a glycerol-based aliphatic diglycidyl ether (viscosity at 25° C. = 0.2 - 1.5 poises, color G.H. = 3 max, weight per epoxide = 300 - 325) sold by Dow Chemical Co. under trademark "Epon 8712" was added. The temperature was held at 90° C. until a hydrophobe was reached in 25° C. water. (A hydrophobe is defined as the point at which one drop of resin imparts a permanent cloudiness when added to approximately 500 mls. of water at 25° C.) At this point 90 grams of ortho-para toluenesulfonamide sold by Monsanto Chemical Company as "Santicizer 9" was added to the reaction and the reaction was held at 80-85° C. for five minutes. Then 74 grams of methanol and 74 grams of water were added to the reaction and the resin was cooled to room temperature.

Part B

Decorative solid color print sheets and clear overlay sheets were impregnated with the resin prepared in Part A and subsequently 0.050 inch thick postforming laminates were molded for evaluation using standard procedures described hereinbefore. As a control, similar sheets were impregnated with a conventional standard postforming resin currently used to produce competitive postforming laminates. Laminates molded for comparison were of four different surface constructions: (1) solid color sheets impregnated with resin from Part A, (2) overlay sheets impregnated with resin from Part A plus print sheets impregnated with a conventional postforming resin, (3) solid color sheets impregnated with a conventional postforming resin, and (4) overlay and print sheets impregnated with a conventional postforming resin. A conventional postforming core of five sheets was used in the construction of all laminates. The resulting diglycidyl ether-modified laminates (1) and (2) exhibited superior postforming characteristics over conventional laminates (3) and (4). None of the laminates were affected by hot water or hot wax and all of the laminates were light stable.

EXAMPLE II

Part A

A reaction flask was charged with 477 of 37% formaldehyde (5.9moles) and 239 grams of water. The formaldehyde-water solution was adjusted to a pH of 8.5 with a 10% sodium hydroxide solution. Then 450 grams of melamine (3.58 moles) were added and the mixture was refluxed for fifteen minutes. Then 27.8 grams of melamine (0.22 moles ) and 23 grams of "Epon 8712"

resin were added and reflux was continued until the resin hydrophobed in 25° C. water. The reaction was then cooled to 85°–90° C. and held at that temperature until a water dilutability of 200% at 25° C. was reached. (Percent water dilutability is that at 25° C. water by volume that can be added to 20 mls. of resin at 25° C. before the resin forms a permanent cloud.) At this point, 74 grams of methanol and 74 grams of water were added to the reaction and the resin was cooled to room temperature.

Part B

Decorative solid color and overlay sheets were impregnated with the resin prepared in Part A and subsequently 0.050 inch postforming laminates were molded for evaluation utilizing the above impregnated sheets and similar sheets impregnated with conventional postforming resins for controls. Laminates molded for comparison were of four (4) different surface constructions: (1) solid color sheets impregnated with resin from Part A, (2) overlay sheets impregnated with resin from Part A plus print sheets impregnated with a conventional postforming resin, (3) solid color sheets impregnated with a conventional postforming resin and (4) overlay and print sheets impregnated with conventional postforming resins. A conventional postforming core of five sheets was used in the construction of all laminates. The resulting diglycidyl ether-modified laminates (1) and (2) exhibited superior postforming characteristics over conventional laminates (3) and (4). None of the laminates were affected by hot water or hot wax.

EXAMPLE III

Part A

A reaction flask was charged with 477 grams of 37% formaldehyde (5.9 moles) and 239 grams of water. The formaldehyde-water solution was adjusted to pH 8.4 with 10% sodium hydroxide. Then 450 grams of melamine (3.58 moles) were added. The reaction mixture was heated to reflux and refluxed for ten minutes. Then 45 grams of glycerol-based epoxy resin (E.E.W. = 143–165, viscosity = 100–140 cks., color, G.H. = 3. max.) sold by Dow Chemical Co. as "XD-7160" and 27.8 grams of melamine (0.22 moles) were added and reflux was continued until the resin hydrophobed in ice water. The reaction was then cooled to 90° C. and held there until a water dilutability of approximately 170% was reached. Then 74 grams of methanol and 74 grams of water were added to the reaction and the resin was cooled to room temperature.

Part B

Decorative solid color sheets and overlay sheets were impregnated with the resin prepared in Part A. Subsequently, 0.050 inch postforming laminates were molded utilizing the above treated sheets and similar sheets impregnated with a conventional standard postforming resin to be used as controls. Laminates molded for comparison were of four different surface constructions: (1) solid color impregnated resin from Part A, (2) overlay sheets impregnated with resin from Part A plus print sheets impregnated with a conventional postforming resin, (3) solid color sheets impregnated with a conventional postforming resin and (4) overlay and print and sheets with conventional postforming resins. A conventional postforming core of 5 sheets was used in all constructions. The resulting diglycidyl-ether-modified laminates (1) and (2) exhibited superior postforming characteristics over conventional postforming laminates (3) and (4). All of the laminates were well cured and were not affected by hot water or hot wax.

EXAMPLE IV

Part A

A blend of diglycidyl ether and melamine resins was prepared as follows:

Resin A: To 800 lbs. of the resin of Example I, less the diglycidyl ether, 28 lbs. of "Epon 8712" were added. The resins were blended for 10 minutes.

Resin B: To 800 lbs. of the resin of Example I, less the diglycidyl ether, 28 lbs. of Dow Chemical's epoxy resin "XD-7160" were added. The two resins were blended for 10 minutes.

Part B

Decorative print and overlay sheets were treated with each of the resins prepared in Part A to the following specifications: Overlay sheets treated with Resin A had a treated ratio of 2.87–2.96, greenness of 20–23%, and a volatile content of 3.75–4.1%. Print sheets treated with Resin A had a treated ratio of 1.68–1.74, a greenness of 0.39–0.50%, and a volatile content of 3.2–3.5%. Overlay sheets treated with Resin B had a ratio of 2.90–2.92, greenness of 14.2%, and a volatile content of 3.4%. Print sheets treated with Resin B had a treated ratio of 1.63–1.69, greenness of 0.23–0.36%, and a volatile content of 2.35–3.16%.

Subsequent to treating, 0.050 inch postforming laminates were prepared utilizing the above treated print and overlay sheets for the decorative surface. A conventional postforming core of five sheets was used for the laminate's substrate. Laminates were designated as A and B laminates referring to resins A and B respectively. The laminates were cured on a conventional postforming cycle except that the laminates were held at the peak cycle temperature for about twice as long as is normal for conventional laminates.

Subsequently the above laminates were compared to conventional laminates for postformability characteristics. It was found that laminates A and B postformed a 180° angle at ⅜ inch radius at a temperature of 250° F. which was about 75° F. lower than conventional laminates. The blister temperature on the experimental laminates was from 50° to 75° F. higher than on conventional laminates.

The experimental laminates were tested by a postforming fabricator. It was reported by the fabricator that the above experimental laminates were far superior to any competitive laminates of leading laminators.

EXAMPLE V

A further illustration of the superior qualities of epoxy-modified melamine resins follows: To a sample of Resin B from Part IV. 0.3% of a fatty alcohol phosphate release agent sold by Du Pont As "Zelec NE" was added. Decorative overlay sheets were impregnated with the resin and laminates were prepared from the treated sheets to evaluate transparency and release to evaluate transparency and release qualities. Resins A and B from Part IV had a tendency of not releasing from aluminum-textured finish sheets that are commonly used on decorative laminates. However, with the addition of the release agent above, laminates from Resin B showed no tendency of sticking to aluminum-textured finish sheets. Also, the laminates containing the diglycidyl ether had a far superior gloss finish and showed no signs of solvent areas that are often apparent in conventional postforming laminates.

EXAMPLE VI

Example IV was repeated except that 0.14% (based on resin solids) of "Zelec NE" release agent and 1% triethylamine (based on diglycidyl ether weight were included with the diglycidyl ether. Similar results were obtained.

We claim as our invention:

1. A composition comprising
   1. an aldehyde and melamine in a mole ratio of about 1.5 to about 6;
   2. about 1 to about 50% (by weight based on melamine weight) of a water-soluble, aliphatic diglycidyl ether; and
   3. sufficient water to form a solution of about 15 to about 65% solids.

2. A composition according to claim 1 wherein said aldehyde is formaldehyde.

3. A composition according to claim 1 wherein the mole ratio of said aldehyde to said melamine is about 1.5 to about 2.5.

4. A composition according to claim 1 wherein the amount of said water-soluble, aliphatic diglycidyl ether is about 5 to about 15% (by weight based on melamine weight).

5. A composition according to claim 1 wherein said water-soluble, aliphatic diglycidyl ether has the general formula:

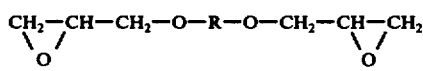

where R is selected from the group consisting of $-CR'-_x$, $-CH_2-CH_2-O-_xCH_2CH_2-$, $-CH(CH_3)-CH_2O-_xCH(CH_3)-CH_2-$, $-CH-CH_2-_yCH-$, and mixtures thereof, were each R' is independently selected from hydrogen and alkyl to about $C_5$, $y$ is 3 to 4, and $x$ has a lower limit of 0 and an upper limit determined by the solubility of the diglycidyl ether.

6. A composition according to claim 5 wherein R is $-CH_2-CH_2-O-_xCH_2CH_2-$.

7. A composition according to claim 5 wherein R is $-CH(CH_3)CH_2O-_xCH(CH_3-CH_2$.

8. A composition according to claim 1 wherein said water-soluble, aliphatic diglycidyl ether is a diglycidyl ether of a polyglycol.

9. A composition according to claim 1 which includes about 0.1 to about 1 phr of a mold release agent and about 0.25 to about 3% (based on the diglycidyl ether) of a curing agent for the diglycidyl ether.

10. A composition according to claim 1 which includes about 1 to about 40% (by weight based on the melamine) of an internal plasticizer.

11. A composition according to claim 1 wherein said aldehyde and said melamine have been reacted to the A-stage.

12. A composition according to claim 1 reacted to the A-stage.

13. An article comprising an absorbent sheet impregnated with an A-staged composition which comprises:
   1. an aldehyde and melamine in a mole ratio of about 1.5 to about 6;
   2. about 1 to about 50% by weight based on melamine weight of a water-soluble, aliphatic diglycidyl ether; and
   3. sufficient water to form a solution of about 15 to about 65% solids.

14. An article according to claim 13 wherein said aldehyde and said melamine are A-stage after their addition to the remainder of said composition.

15. A sheet according to claim 13 wherein said absorbent sheet is alpha-cellulose paper.

16. An article according to claim 13 wherein said aldehyde and said melamine are A-staged prior to their addition to the remainder of said composition.

17. An article according to claim 13 which is B-staged.

18. An article according to claim 13 wherein said aldehyde is formaldehyde.

19. An article according to claim 13 wherein the mole ratio of said aldehyde to said melamine is about 1.5 to about 2.5.

20. An article according to claim 13 wherein the amount of said water-soluble, aliphatic diglycidyl ether is about 5 to about 15% by weight based on melamine weight.

21. An article according to claim 13 wherein said water-soluble, aliphatic diglycidyl ether has the general formula:

$$CH_2-CH-CH_2-O-R-O-CH_2-CH-CH_2$$
$$\phantom{CH_2-CH}\backslash\phantom{-}/\phantom{CH_2-O-R-O-CH_2-}\backslash\phantom{-}/$$
$$\phantom{CH_2-CH-CH}O\phantom{_2-O-R-O-CH_2-CH-}O$$

where R is selected from the group consisting of $-CR'-_x$, $-CH_2-CH_2-O-_x$ $CH_2CH_2-$, $-CH(CH_3)-CH_2O-_xCH(CH_3)-CH_2-$, $-CH-CH_2-_yCH-$, and mixtures thereof, where each R' is independently selected from hydrogen and alkyl to about $C_5$, $y$ is 3 or 4, and $x$ has a lower limit of 0 and an upper limit determined by the solubility of the diglycidyl ether.

22. An article according to claim 21 wherein R is $-CH_2-CH_2-O-_xCH_2CH_2$.

23. An article according to claim 21 wherein R is $-CH(CH_3)CH_2O-_xCH(CH_3-CH_2$.

24. An article according to claim 13 wherein said water-soluble, aliphatic diglycidyl ether is a diglycidyl ether of a polyglycol.

25. An article according to claim 13 which includes about 0.1 to about 1 phr of a mold release agent and about 0.25 to about 3% based on the diglycidyl ether of a curing agent for the diglycidyl ether.

26. An article according to claim 13 which includes about 1 to about 40% by weight based on the melamine of an internal plasticizer.

27. An article according to claim 26 wherein said internal plasticizer is toluene sulfonamide.

28. An article according to claim 13 wherein said composition includes about 1 to about 10 phr of a solvent.

29. An article according to claim 13 wherein the amount of water in said composition is about 40 to about 60%.

30. An article according to claim 13 which has been cured to the C-stage.

31. A laminate comprising a postformable core stock to which is bonded at least one absorbent sheet impregnated with a C-staged composition comprising:
   A. an aldehyde and melamine in a mole ratio of about 1.5 to about 6;

B. about 1 to about 50% by weight based on melamine weight of a water-soluble, aliphatic diglycidyl ether; and c. sufficient water to form a solution of about 15 to about 65% solids.

32. A laminate according to claim 31 wherein said core stock comprises about 1 to about 15 absorbent sheets impregnated with a postformable phenol-aldehyde resin.

33. A laminate according to claim 32 wherein said phenol-aldehyde resin is phenol-formaldehyde.

34. A laminate according to claim 31 which is in a postformed condition.

35. A laminate according to claim 34 adhesively-bonded to a substrate.

36. A laminate according to claim 31 wherein said aldehyde and said melamine are A-staged after their addition to the remainder of said composition.

37. A laminate according to claim 31 wherein said aldehyde and said melamin are A-staged prior to their addition to the remainder of said composition.

38. A laminate according to claim 31 which is B-staged.

39. A laminate according to claim 31 wherein said aldehyde is formaldehyde.

40. A laminate according to claim 31 wherein the mole ratio of said aldehyde to said melamine is about 1.5 to about 2.5.

41. A laminate according to claim 31 wherein the amount of said water-soluble, aliphatic diglycidyl ether is about 5 to about 15% by weight based on melamine weight.

42. A laminate according to claim 31 wherein said water-soluble, aliphatic diglycidyl ether has the general formula:

$$CH_2-CH-CH_2-O-R-O-CH_2-CH-CH_2$$
$$\backslash\ /\quad\quad\quad\quad\quad\quad\quad\quad\quad\backslash\ /$$
$$O\quad\quad\quad\quad\quad\quad\quad\quad\quad\quad\quad O$$

wherein R is selected from the group consisting to $+CR'+_x$, $+CH_2-CH_2-O+_xCH_2CH_2-$, $+CH(CH_3)-CH_2O+_x$ $CH(CH_3)-CH_2-$, $-CH +CH_2+_yCH-$, and mixtures thereof, where each R' is independently selected from hydrogen and alkyl to about $C_5$, y is 3 or 4, and x has a lower limit of 0 and an upper limit determined by the solubility of the diglycidyl ether.

43. A laminate according to claim 42 wherein R is $+CH_2-CH_2-O+_xCH_2CH_2$.

44. A laminate according to claim 42 wherein R is $+CH(CH_3)CH_2O+_xCH(CH_3+CH_2$.

45. A laminate according to claim 31 wherein said water-soluble, aliphatic diglycidyl ether is a diglycidyl ether of a polyglycol.

46. A laminate according to claim 31 which includes about 0.1 to about 1 phr of a mold release agent and about 0.25 to about 3% based on the diglycidyl ether of a curing agent for the diglycidyl ether.

47. A laminate according to claim 31 which includes about 1 to about 40% by weight based on the melamine of an internal plasticizer.

48. A laminate according to claim 47 wherein said internal plasticizer is toluene sulfonamide.

49. An articl according to claim 31 wherein said composition includes about 1 to about 10 phr of a solvent.

50. A laminate according to claim 31 wherein the amount of water in said composition is about 40 to about 60%.

51. A laminate according to claim 31 which has been cured to the C-stage.

52. A method of making a postformable laminate comprising:
A. preparing an A-staged composition which comprises
1. an aldehyde and melamine in a mole ratio of about 1.5 to about 6;
2. about 1 to about 50% by weight based on melamine weight of water-soluble, aliphatic diglycidyl ether; and
3. sufficient water to form a solution of about 15 to about 65% solids.
B. applying said composition to an absorbent sheet to a weight ratio of composition solids to absorbent sheet of about 1.2 to about 4.0;
C. reacting said composition to the B-stage;
D. forminga stack of at least one of said sheets with a postformable core stock; and
E. curing said stack to the C-stage.

53. A method according to claim 52 wherein said aldehyde and said melamine are A-staged after their addition to the remainder of said composition.

54. A method according to claim 52 wherein said aldehyde and siad melamine are A-staged prior to their addition to the remainder of said composition.

55. A method according to claim 52 which is B-staged.

56. A method according to claim 52 wherein said aldehyde is formaldehyde.

57. A method according to claim 52 wherein the mole ratio of said aldehyde to said melamine is about 1.5 to about 2.5.

58. A method according to claim 52 wherein the amount of said water-soluble, aliphatic diglycidyl ether is about 5 to about 15% by weight based on melamine weight.

59. A method according to claim 52 wherein said water-soluble, aliphatic diglycidyl ether has the general formula:

$$CH_2-CH-CH_2-O-R-O-CH_2-CH-CH_2$$
$$\backslash\ /\quad\quad\quad\quad\quad\quad\quad\quad\quad\backslash\ /$$
$$O\quad\quad\quad\quad\quad\quad\quad\quad\quad\quad\quad O$$

where R is selected from the group consisting of $-CH'-_x$, $-CH_2-CH_2-O-_x$ $CH_2CH_2-$, $-CH(CH_3)-CH_2O-_xCH(CH_3)-CH_2-$, $-CH-CH_2-_yCH-$, and mixtures thereof, where each R' is independently selected from hydrogen and alkyl to about $C_5$, y is 3 or 4, and x has a lower limit of 0 and an upper limit determined by the solubility of the diglycidyl ether.

60. A method according to claim 59 wherein R is $-CH_2-CH_2-O-_xCH_2CH_2$.

61. A method according to claim 59 wherein R is $-CH(CH_3)CH_2O-_xCH(CH_3-CH_2$.

62. A method according to claim 52 wherein said water-soluble, aliphatic diglycidyl ether is a diglycidyl ether of a polyglycol.

63. A method according to claim 52 which includes about 0.01 to about 1 phr of a mold release agent and about 0.25 to about 3% based on the diglycidyl ether of a curing agent for the diglycidyl ether.

64. A method according to claim 52 which includes about 1 to about 40% by weight based on the melamine of an internal plasticizer.

65. A method according to claim 64 wherein said internal plasticizer is toluene sulfonamide.

66. A method according to claim 52 within said composition includes about 1 to about 10 phr of a solvent.

67. A method according to claim 52 wherein the amount of water in said composition is about 40 to about 60%.

68. A method according to claim 52 which has been cured to the C-stage.

* * * * *